US012635603B2

(12) United States Patent
Matsuda

(10) Patent No.: US 12,635,603 B2
(45) Date of Patent: May 26, 2026

(54) LAWN MOWER

(71) Applicant: KAWASAKI MOTORS, LTD., Akashi (JP)

(72) Inventor: Yoshimoto Matsuda, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 580 days.

(21) Appl. No.: 18/172,914

(22) Filed: Feb. 22, 2023

(65) Prior Publication Data

US 2024/0276913 A1     Aug. 22, 2024

(51) Int. Cl.
| | |
|---|---|
| *A01D 34/00* | (2006.01) |
| *A01D 34/66* | (2006.01) |
| *A01D 34/69* | (2006.01) |
| *A01D 34/76* | (2006.01) |
| *A01D 34/78* | (2006.01) |
| *A01D 34/82* | (2006.01) |
| *A01D 101/00* | (2006.01) |

(52) U.S. Cl.
CPC ........... *A01D 34/76* (2013.01); *A01D 34/006* (2013.01); *A01D 34/69* (2013.01); *A01D 34/826* (2013.01); *A01D 2101/00* (2013.01)

(58) Field of Classification Search
CPC ...... A01D 34/76; A01D 34/006; A01D 34/69; A01D 34/826; A01D 34/78; A01D 34/66; A01D 34/824; A01D 69/02
See application file for complete search history.

(56) References Cited

U.S. PATENT DOCUMENTS

| | | | |
|---|---|---|---|
| 2016/0183451 A1* | 6/2016 | Conrad ................... | A01D 34/66 |
| | | | 56/10.2 R |
| 2021/0289699 A1* | 9/2021 | Fukano ................ | A01D 34/824 |
| 2022/0007571 A1* | 1/2022 | Foster .................. | A01D 34/008 |
| 2022/0354049 A1 | 11/2022 | Zeiler et al. | |
| 2022/0408638 A1* | 12/2022 | Ito ......................... | A01D 34/662 |

* cited by examiner

*Primary Examiner* — Joseph M Rocca
*Assistant Examiner* — Robert E Pezzuto
(74) *Attorney, Agent, or Firm* — Alleman Hall LLP

(57) ABSTRACT

A lawn mower includes: a cutting blade motor that drives a cutting blade; a mode selector that selects one of modes including a normal lawn mowing mode and a grass removal mode in which grass accumulated at the cutting blade is brushed away; and processing circuitry configured to control the cutting blade motor in the mode selected by the mode selector. In the normal lawn mowing mode, the cutting blade motor is controlled so as to rotate in a normal rotation direction at a predetermined rotational frequency or with a predetermined torque. In the grass removal mode, the cutting blade motor is controlled such that the rotational frequency or torque of the cutting blade motor changes more significantly than the rotational frequency or torque of the cutting blade motor in the normal lawn mowing mode, or the cutting blade motor rotates in a reverse rotation direction.

10 Claims, 4 Drawing Sheets

STOP

LAWN MOWER

BACKGROUND OF THE INVENTION

Field of the Invention

The present disclosure relates to a lawn mower.

Description of the Related Art

US 2022/0354049 A1 discloses an electric lawn mower in which: rear wheels are driven by wheel motors; and cutting blades are driven by cutting blade motors. When grass is accumulated at the cutting blades, lawn mowing performance may deteriorate.

SUMMARY OF THE INVENTION

A lawn mower according to one aspect of the present disclosure includes: a cutting blade motor that drives a cutting blade; a mode selector that selects one of modes including a normal lawn mowing mode and a grass removal mode in which grass accumulated at the cutting blade is brushed away; and processing circuitry configured to control the cutting blade motor in the mode selected by the mode selector. In the normal lawn mowing mode, the cutting blade motor is controlled so as to rotate in a normal rotation direction at a predetermined rotational frequency or with a predetermined torque. In the grass removal mode, the cutting blade motor is controlled such that the rotational frequency or torque of the cutting blade motor changes more significantly than the rotational frequency or torque of the cutting blade motor in the normal lawn mowing mode, or the cutting blade motor rotates in a reverse rotation direction.

According to this configuration, when the grass is accumulated at the cutting blade by the operation of the lawn mower, the grass can be brushed away from the cutting blade by the execution of the grass removal mode.

DESCRIPTION OF THE PREFERRED EMBODIMENTS

Hereinafter, an embodiment will be described with reference to the drawings.

Figure 1:
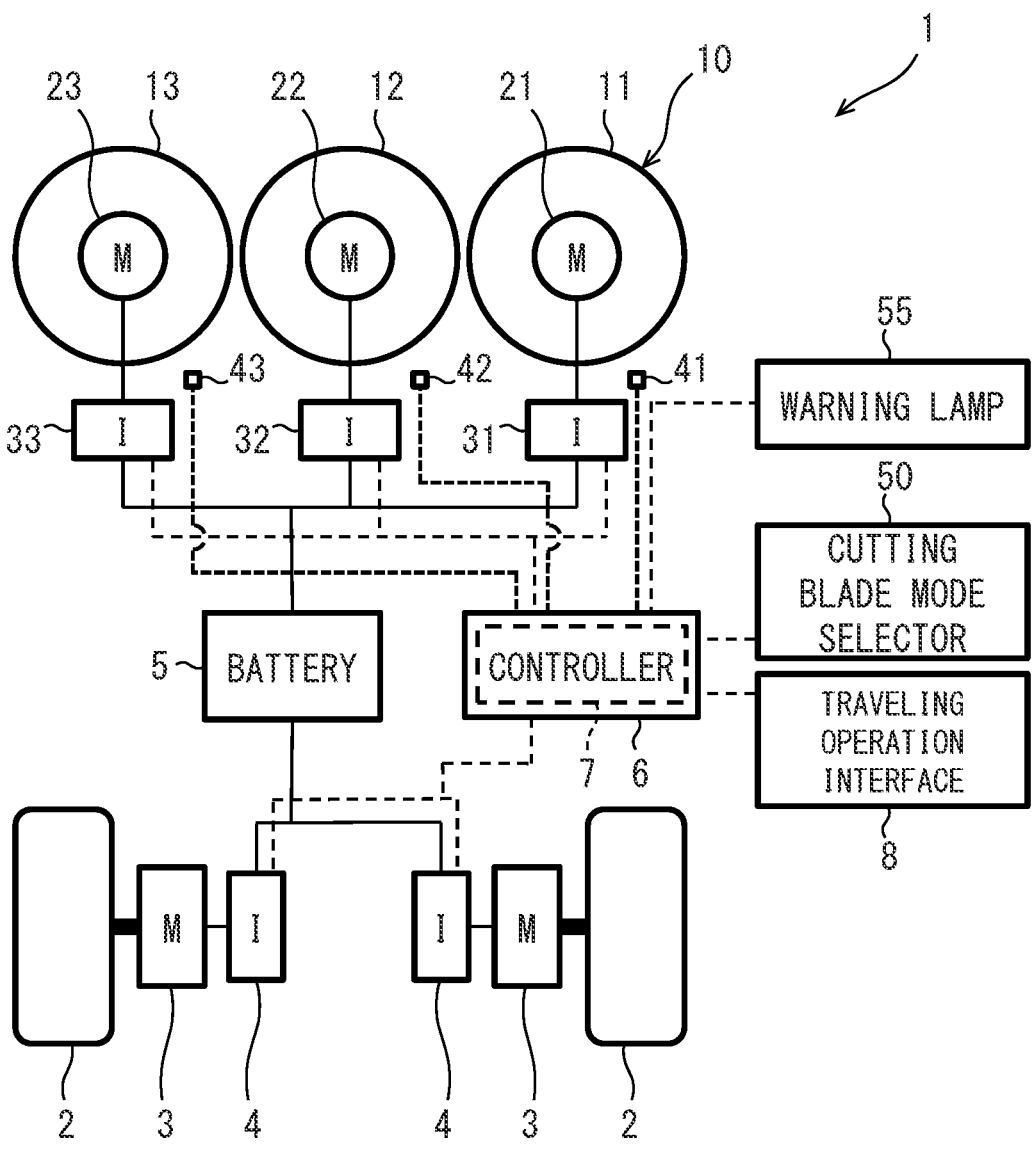
FIG. 1 is a block diagram of a lawn mower according to an embodiment.

FIG. 1 is a block diagram of a lawn mower 1 according to the embodiment. As shown in FIG. 1, the lawn mower 1 includes a pair of left and right driving wheels 2 and steered wheels as driven wheels. The lawn mower 1 is, for example, a riding lawn mower. Traveling motors 3 are mechanically connected to the pair of left and right driving wheels 2, respectively. The traveling motors 3 are electric motors. Inverters 4 are electrically connected to the pair of left and right traveling motors 3, respectively. The inverters 4 may be incorporated in the respective traveling motors 3. A battery 5 is electrically connected to the pair of left and right inverters 4. A controller 6 is electrically connected to the pair of left and right inverters 4.

The controller 6 includes processing circuitry 7. For example, the controller 6 includes a processor and a memory. Specifically, the controller 6 includes a CPU, a system memory, a storage memory, and the like. The CPU is a central processing unit. The system memory is, for example, a RAM. The storage memory is one example of a computer-readable medium and is a non-transitory and tangible medium. The storage memory may include a ROM. The storage memory may include a hard disk, a flash memory, or a combination thereof. The storage memory stores a program. A configuration in which the CPU executes the program read by the system memory is one example of the processing circuitry 7. Part of the program or the entire program may be executed by a processor of a server connected to the controller 6 through a network.

The lawn mower 1 includes a cutting blade set 10. The cutting blade set 10 includes, for example, a right cutting blade 11, a middle cutting blade 12, and a left cutting blade 13. In the present embodiment, the cutting blades 11 to 13 are linearly lined up in a left-right direction of the lawn mower 1. However, the positions of the cutting blades 11 to 13 may be different from each other in a front-rear direction of the lawn mower 1. Moreover, the number of cutting blades 11 to 13 is not limited to three and may be one, two, or four or more.

The right cutting blade 11 is rotated by driving of a right cutting blade motor 21. The middle cutting blade 12 is rotated by driving of a middle cutting blade motor 22. The left cutting blade 13 is rotated by driving of a left cutting blade motor 23. A right inverter 31 is electrically connected to the right cutting blade motor 21. A middle inverter 32 is electrically connected to the middle cutting blade motor 22. A left inverter 33 is electrically connected to the left cutting blade motor 23. The cutting blade motors 21 to 23 are electric motors. The cutting blades 11 to 13 are attachable to and detachable from the cutting blade motors 21 to 23, respectively.

The controller 6 is electrically connected to the inverters 31 to 33. The controller 6 may be divided into: a controller that controls the traveling motors 3 through the inverters 4; and a controller that controls the cutting blade motors 21 to 23 through the inverters 31 to 33. Moreover, the controller 6 may be divided into: a controller that controls the traveling motor 3 driving the right driving wheel 2; and a controller that controls the traveling motor 3 driving the left driving wheel 2.

A traveling operation interface 8 is electrically connected to the controller 6. The traveling operation interface 8 is operated by a driver to command the operations of the traveling motors 3 that drive the pair of driving wheels 2. A cutting blade mode selector 50 is electrically connected to the controller 6. The cutting blade mode selector 50 is operated by the driver to select and command operating modes of the cutting blade motors 21 to 23.

The controller 6 controls a warning lamp 55. In the lawn mower 1, the warning lamp 55 is located at a position that can be visually recognized by the driver. The warning lamp 55 is one example of a display that can display warning. The warning lamp 55 can be turned on, can be tuned off, and can blink. Instead of the warning lamp 55, a display screen may be used as the display.

Figure 2:
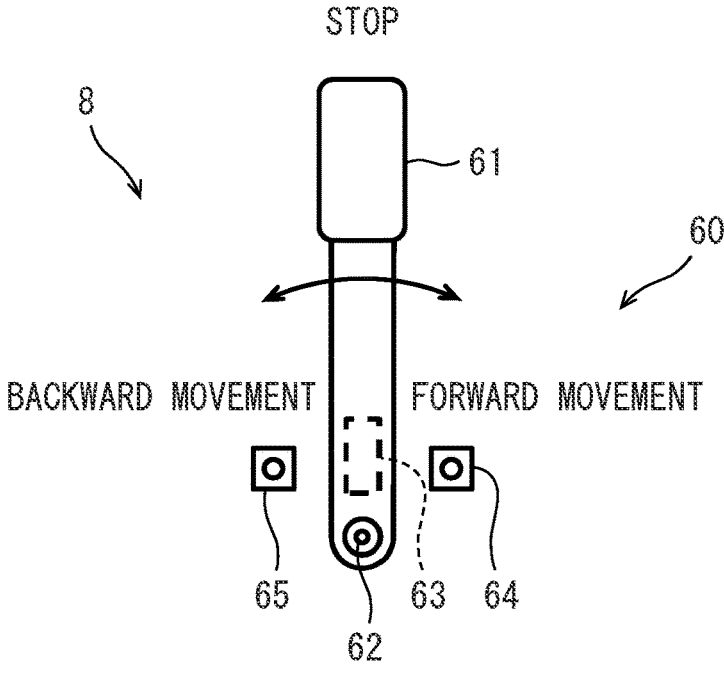
FIG. 2 is a side view of a traveling operation interface of FIG. 1.

FIG. 2 is a side view of the traveling operation interface 8 of FIG. 1. As shown in FIG. 2, the traveling operation interface 8 includes: a traveling selector 60 for the right driving wheel 2; and a traveling selector 60 for the left driving wheel 2. In FIG. 2, only one of the pair of traveling selectors 60 is representatively shown. The traveling selector 60 includes a traveling operating lever 61, a swing shaft 62, a magnet 63, a forward movement input sensor 64, and a backward movement input sensor 65.

The traveling operating lever 61 is operated by the driver with his/her hand to swing about the swing shaft 62 as a spindle. The magnet 63 is fixed to the traveling operating lever 61. When viewed in an axial direction of the swing shaft 62, the forward movement input sensor 64 and the backward movement input sensor 65 are located on a movement trajectory of the magnet 63 that moves by the swinging of the traveling operating lever 61. Each of the forward movement input sensor 64 and the backward movement input sensor 65 is a magnetic sensor, such as a Hall IC. Each of the forward movement input sensor 64 and the backward movement input sensor 65 is configured such that: when the magnet 63 is located away from the input sensor, the input sensor detects that OFF is being selected; and when the magnet 63 is located close to the input sensor, the input sensor detects that ON is being selected.

The traveling operating lever 61 is biased by a spring so as to be located at such a stop position that both of the forward movement input sensor 64 and the backward movement input sensor 65 do not detect the magnet 63. When the driver swings the traveling operating lever 61 toward a forward movement position, the forward movement input sensor 64 detects the magnet 63. The forward movement input sensor 64 detects the magnet 63 to detect that the ON of the forward movement has been selected by the driver. When the driver swings the traveling operating lever 61 toward a backward movement position, the backward movement input sensor 65 detects the magnet 63. The backward movement input sensor 65 detects the magnet 63 to detect that the ON of the backward movement has been selected by the driver.

When linearly moving the lawn mower 1 forward, the driver simultaneously operates both the traveling operating lever 61 of the traveling selector 60 for the right driving wheel 2 and the traveling operating lever 61 of the traveling selector 60 for the left driving wheel 2 toward the forward movement position. When linearly moving the lawn mower 1 backward, the driver simultaneously operates both the traveling operating lever 61 of the traveling selector 60 for the right driving wheel 2 and the traveling operating lever 61 of the traveling selector 60 for the left driving wheel 2 to the backward movement position. When moving the lawn mower 1 forward while turning the lawn mower 1 rightward, the driver operates the traveling operating lever 61 of the traveling selector 60 for the left driving wheel 2 toward the forward movement position and operates the traveling operating lever 61 of the traveling selector 60 for the right driving wheel 2 toward a position other than the forward movement position.

In the present embodiment, the traveling selector 60 including only three operation positions that are the forward movement position, the stop position, and the backward movement position is described as one example of the traveling operation interface 8. However, an accelerator that can continuously increase an acceleration command value may be used. Moreover, the traveling operation interface 8 may include: only one traveling selector 60 used for both of the left and right traveling motors 3 in common; and a steering wheel which is turned by the driver to command turning traveling.

Figure 3:
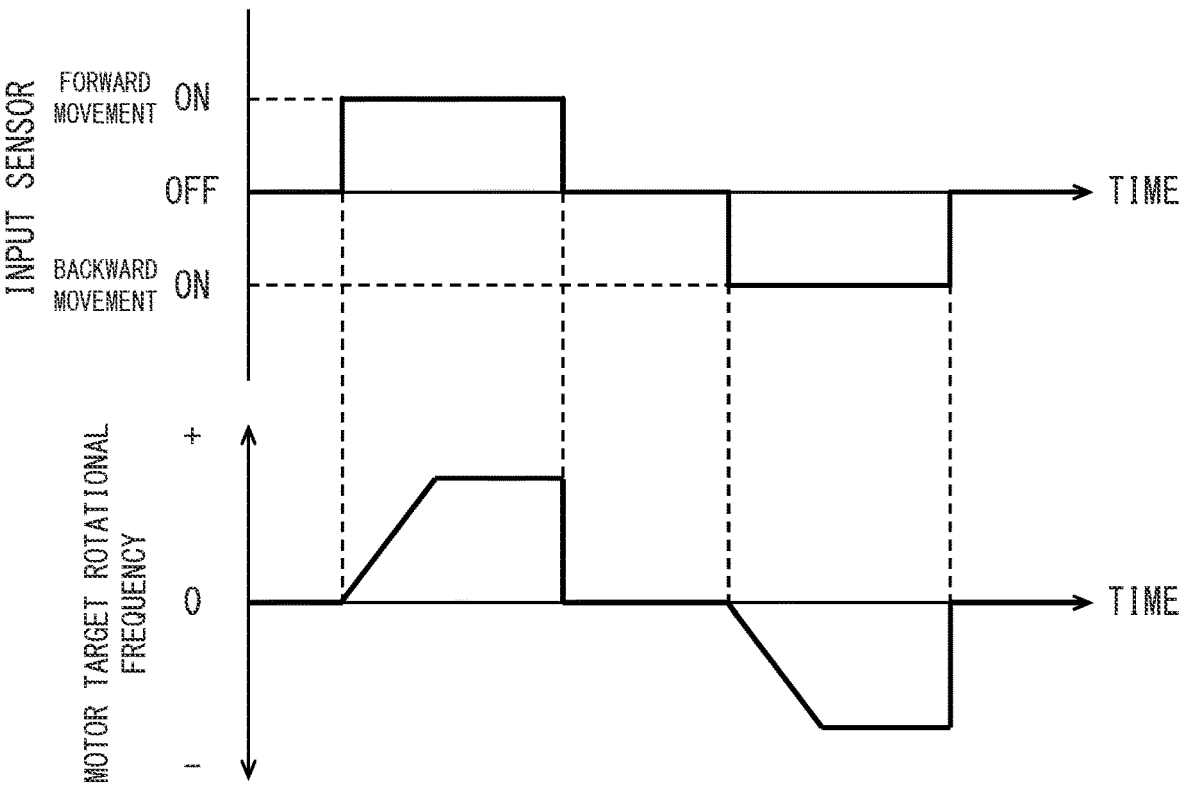
FIG. 3 is a timing chart showing a relation between an input sensor of the traveling operation interface of FIG. 2 and a motor target rotational frequency.

FIG. 3 is a timing chart showing a relation between the input sensors 64 and 65 of the traveling operation interface 8 of FIG. 2 and a motor target rotational frequency. Hereinafter, the timing chart of FIG. 3 will be described with reference to the configurations shown in FIGS. 1 and 2. When the traveling operating lever 61 is located at the stop position, the forward movement input sensor 64 and the backward movement input sensor 65 do not detect the magnet 63, and therefore, both of the sensors 64 and 65 select the OFF. At this time, the processing circuitry 7 controls the inverters 4 so as to stop the traveling motors 3.

Next, when the traveling operating lever 61 is operated by the driver from the stop position to the forward movement position, the forward movement input sensor 64 changes from a state where the OFF is being selected to a state where the ON is being selected. Then, upon reception of an ON signal from the forward movement input sensor 64, the processing circuitry 7 changes a control target value of the traveling motor 3 in a predetermined pattern such that the traveling motor 3 drives in a normal rotation direction corresponding to the forward movement.

Specifically, when the rotational frequency of the traveling motor 3 is controlled by feedback control, the processing circuitry 7 increases a target rotational frequency of the traveling motor 3 at a predetermined change rate with time. When the target rotational frequency of the traveling motor 3 reaches a predetermined value, the processing circuitry 7 maintains the target rotational frequency of the traveling motor 3 constant. With this, even in the case of using the input sensors 64 and 65 that can only detect which of the ON and the OFF has been selected, the lawn mower 1 can start traveling with smooth driving feeling.

As another example, when the torque of the traveling motor 3 is controlled by feedforward control, the processing circuitry 7 increases a target torque of the traveling motor 3 at a predetermined change rate with time. When the target torque of the traveling motor 3 reaches a predetermined value, the processing circuitry 7 maintains the target torque of the traveling motor 3 constant. The target torque of the traveling motor 3 corresponds to a target value of a current supplied from the inverter 4 to the traveling motor 3.

Next, when the traveling operating lever 61 is operated by the driver from the forward movement position to the stop position, the forward movement input sensor 64 changes from the state where the ON is being selected to the state where the OFF is being selected. Then, upon reception of OFF signals from both of the forward movement input sensor 64 and the backward movement input sensor 65, the processing circuitry 7 sets the control target value to zero.

Specifically, when the rotational frequency of the traveling motor 3 is controlled by feedback control, the processing circuitry 7 sets the target rotational frequency of the traveling motor 3 to zero. With this, when the traveling operating lever 61 is operated by the driver from the forward movement position to the stop position, the lawn mower 1 can be quickly stopped.

As another example, when the torque of the traveling motor 3 is controlled by feedforward control, the processing circuitry 7 sets the target torque of the traveling motor 3 to zero upon reception of the OFF signals from both of the forward movement input sensor 64 and the backward movement input sensor 65.

Next, when the traveling operating lever 61 is operated by the driver from the stop position to the backward movement position, the backward movement input sensor 65 changes from the state where the OFF is being selected to the state where the ON is being selected. Then, upon reception of the ON signal from the backward movement input sensor 65, the processing circuitry 7 changes the control target value of the traveling motor 3 in a predetermined pattern such that the traveling motor 3 drives in a reverse rotation direction corresponding to the backward movement. Since the predetermined pattern at the time of the backward movement is the same as that at the time of the forward movement, a detailed explanation thereof is omitted. A maximum target rotational frequency at the time of the backward movement may be set to be lower than a maximum target rotational frequency at the time of the forward movement.

Figure 4:
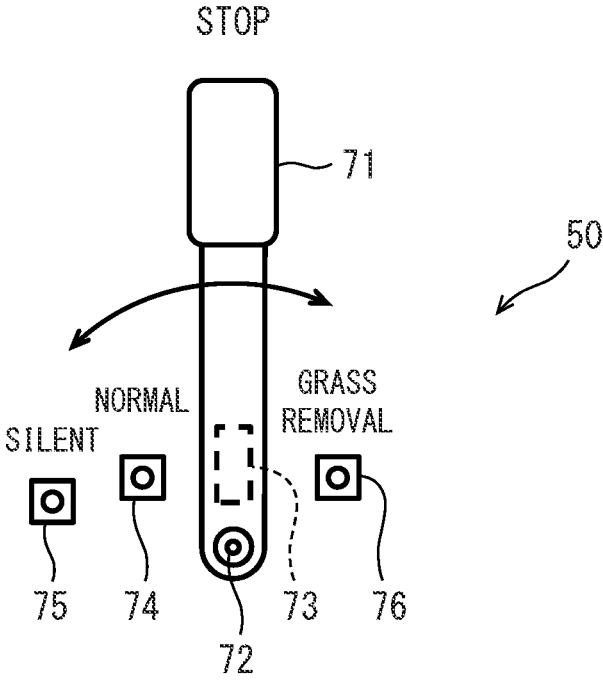
FIG. 4 is a side view of a mode selector of FIG. 1.

FIG. 4 is a side view of the cutting blade mode selector 50 of FIG. 1. As shown in FIG. 4, the cutting blade mode selector 50 is operated by the driver to select and command the operating modes of the cutting blade motors 21 to 23. The cutting blade mode selector 50 includes a mode operating lever 71, a swing shaft 72, a magnet 73, a normal mode input sensor 74, a silent mode input sensor 75, and a grass removal mode input sensor 76.

The mode operating lever 71 is operated by the driver with his/her hand to swing about the swing shaft 72 as a spindle. The magnet 73 is fixed to the mode operating lever 71. When viewed in an axial direction of the swing shaft 72, the normal mode input sensor 74, the silent mode input sensor 75, and the grass removal mode input sensor 76 are located on a movement trajectory of the magnet 73 that moves by the swinging of the mode operating lever 71. Each of the input sensors 74 to 76 is a magnetic sensor, such as a Hall IC. Each of the input sensors 74 to 76 is configured such that: when the magnet 73 is located away from the input sensor, the input sensor detects that the OFF is being selected; and when the magnet 73 is located close to the input sensor, the input sensor detects that the ON is being selected.

The mode operating lever 71 is biased by a spring so as to be located at such a stop position that the input sensors 74 to 76 do not detect the magnet 73. When the driver swings the mode operating lever 71 to a normal lawn mowing position, the normal mode input sensor 74 detects the magnet 73. At this time, the silent mode input sensor 75 and the grass removal mode input sensor 76 do not detect the magnet 73. The normal mode input sensor 74 detects the magnet 73 to detect that a normal lawn mowing mode has been selected by the driver.

When the driver swings the mode operating lever 71 to a silent lawn mowing position, the silent mode input sensor 75 detects the magnet 73. At this time, the normal mode input sensor 74 and the grass removal mode input sensor 76 do not detect the magnet 73. The silent mode input sensor 75 detects the magnet 73 to detect that a silent lawn mowing mode has been selected by the driver.

When the driver swings the mode operating lever 71 to a grass removal position, the grass removal mode input sensor 76 detects the magnet 73. At this time, the normal mode input sensor 74 and the silent mode input sensor 75 do not detect the magnet 73. The silent mode input sensor 75 detects the magnet 73 to detect that a grass removal mode has been selected by the driver.

Referring back to FIG. 1, in the normal lawn mowing mode, the processing circuitry 7 controls the inverters 31 to 33 such that the cutting blade motors 21 to 23 rotate in a normal rotation direction at a predetermined rotational frequency or with a predetermined torque. For example, when the rotational frequencies of the cutting blade motors 21 to 23 are controlled by feedback control, in the normal lawn mowing mode, the processing circuitry 7 controls the inverters 31 to 33 such that the cutting blade motors 21 to 23 rotate in the normal rotation direction at the predetermined rotational frequency. As another example, when the torques of the cutting blade motors 21 to 23 are controlled by feedforward control, in the normal lawn mowing mode, the processing circuitry 7 controls the inverters 31 to 33 such that the cutting blade motors 21 to 23 rotate in the normal rotation direction with the predetermined torque. The torques of the cutting blade motors 21 to 23 correspond to the currents supplied from the inverters 31 to 33 to the cutting blade motors 21 to 23.

In the silent lawn mowing mode, the processing circuitry 7 controls the inverters 31 to 33 such that the cutting blade motors 21 to 23 rotate in the normal rotation direction at a rotational frequency lower than that in the normal lawn mowing mode or with a torque lower than that in the normal lawn mowing mode. With this, when the cutting blade mode selector 50 selects the silent lawn mowing mode, the lawn mower 1 can be silently driven.

The grass removal mode is a mode for brushing away the grass accumulated at the cutting blades. In the grass removal mode, the processing circuitry 7 controls the inverters 31 to 33 such that the rotational frequencies or torques of the cutting blade motors 21 to 23 change more significantly than those in the normal lawn mowing mode. In the grass removal mode, the processing circuitry 7 controls the inverters 31 to 33 so as to give pulsation to the rotational frequencies or torques of the cutting blade motors 21 to 23. As another example, in the grass removal mode, the processing circuitry 7 controls the inverters 31 to 33 such that the cutting blade motors 21 to 23 rotate in a reverse rotation direction. As above, when the grass is accumulated at the cutting blades 11 to 13 by the operation of the lawn mower 1, the grass can be brushed away from the cutting blades 11 to 13 by the execution of the grass removal mode.

The lawn mower 1 may include cutting blade mode selectors 50 corresponding to the respective cutting blades 11 to 13. To be specific, the processing circuitry 7 may control the cutting blade motors 21 to 23 such that the cutting blades 11 to 13 operate in different modes. For example, while the processing circuitry 7 is controlling the cutting blade motors 21 to 23 in the normal lawn mowing mode, the processing circuitry 7 may switch only one of the cutting blade motors 21 to 23 so as to control the cutting blade motor 21, 22, or 23 in the grass removal mode.

When the normal lawn mowing mode or the silent lawn mowing mode is switched to the grass removal mode, the processing circuitry 7 may control the inverters 4 so as to stop or decelerate the traveling motors 3. Then, when the grass removal mode returns to the normal lawn mowing mode or the silent lawn mowing mode, the processing circuitry 7 may control the inverters 4 such that the traveling motors 3 return to normal traveling.

When a predetermined condition indicating that the grass has been accumulated at the cutting blades 11 to 13 is satisfied, the processing circuitry 7 outputs a warning signal by which the warning lamp 55 is turned on. The turning-on of the warning lamp 55 can urge the driver to operate the cutting blade mode selector 50 to select the grass removal mode. When the predetermined condition indicating that the grass has been accumulated at the cutting blades 21 to 23, the processing circuitry 7 may output a warning signal by which the cutting blade motors 21 to 23 are urgently stopped.

The lawn mower 1 includes a right cutting blade sensor 41, a middle cutting blade sensor 42, and a left cutting blade sensor 43. The right cutting blade sensor 41 detects that the grass has been accumulated at the right cutting blade 11. The middle cutting blade sensor 42 detects that the grass has been accumulated at the middle cutting blade 12. The left cutting blade sensor 43 detects that the grass has been accumulated at the left cutting blade 13. The processing circuitry 7 determines based on signals from the cutting blade sensors 41 to 43 whether or not the predetermined condition indicating that the grass has been accumulated at the cutting blades 11 to 13 has been satisfied.

The cutting blade sensors 41 to 43 may be current sensors that detect current values of the cutting blade motors 21 to 23. When the rotational frequency of the traveling motor 3 is controlled by feedback control, and one of the detected current values of the cutting blade sensors 41 to 43 exceeds a predetermined allowable value, the processing circuitry 7 determines that the grass has been accumulated at the cutting blade 11, 12, or 13, and outputs the warning signal. At this time, the processing circuitry 7 may output the warning signal by which the cutting blade sensor at which the grass has been accumulated among the cutting blade sensors 41 to 43 can be determined. For example, the lawn mower 1 may include warning lamps 55 corresponding to the respective cutting blade sensors 41 to 43.

The cutting blade sensors 41 to 43 may be rotational frequency sensors that detect the rotational frequencies of the cutting blade motors 21 to 23. When the torque of the traveling motor 3 is controlled by feedforward control, and one of the detected rotational frequencies of the cutting blade sensors 41 to 43 falls below the predetermined allowable value, the processing circuitry 7 determines that the grass has been accumulated at the cutting blade 11, 12, or 13, and outputs the warning signal.

The cutting blade sensors 41 to 43 may be object detection sensors that detect the grass accumulated at the cutting blade motors 21 to 23. For example, the object detection sensor may be an infrared sensor, a camera, or a laser sensor.

Figure 5:
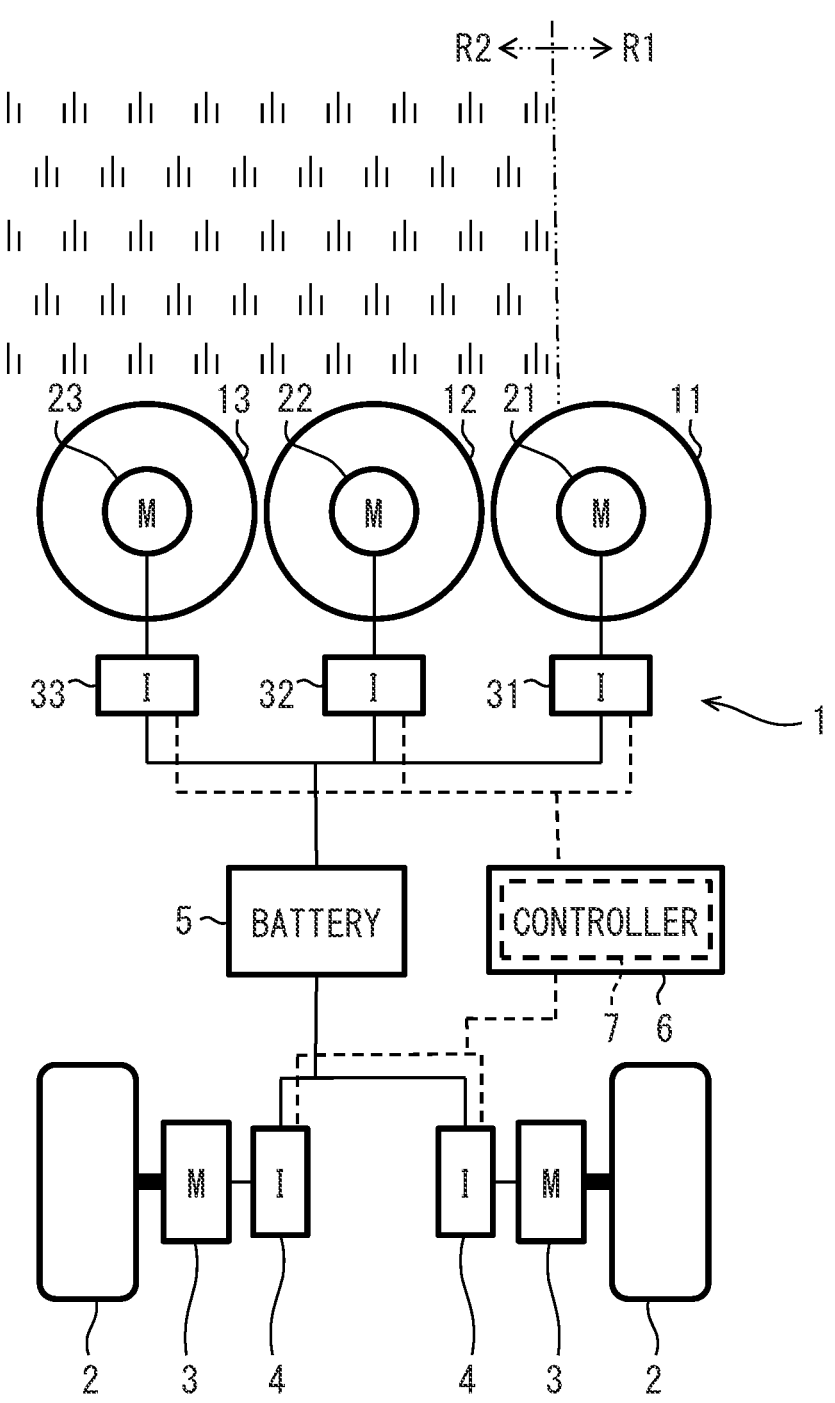
FIG. 5 is a plan view showing an environment of the lawn mower of FIG. 1.

FIG. 5 is a plan view showing an environment of the lawn mower 1 of FIG. 1. As shown in FIG. 5, during lawn mowing work performed by the lawn mower 1, a first region R1 where the lawn mowing has already been performed and a second region R2 where the lawn mowing has not been performed yet exist adjacent to each other. When the lawn mower 1 travels in the first region R1 and the second region R2 at the same time, the processing circuitry 7 may control the right inverter 31 so as to reduce the rotational frequency or torque of the right cutting blade motor 21 that drives the cutting blade 11 corresponding to the first region R1.

The lawn mower 1 may include a camera that can take an image of the environment, and the processing circuitry 7 may recognize a boundary between the first region R1 and the second region R2 by subjecting the image taken by the camera to image processing. When the lawn mower 1 autonomously travels, the processing circuitry 7 may recognize the boundary between the first region R1 and the second region R2 by referring to a past traveling history in a traveling route plan of autonomous traveling.

The technology of the present disclosure is not limited to the above embodiment. For example, the lawn mower 1 does not have to be a riding lawn mower and may be a hand push lawn mower. The traveling motor 3 is not limited to an electric motor and may be another type of motor (for example, a hydraulic motor). The controller 6 may be divided into controllers. For example, a first controller that controls the inverters 31 to 33 for the cutting blades 11 to 13 and a second controller that controls the inverters 4 for the driving wheels 2 may communicate with each other.

Each of the input sensors 64 to 65 and 74 to 76 may be a mechanical switch that can detect which of the OFF and the ON has been selected. The cutting blade mode selector 50 is not limited to a selector that performs mode selection by manual operation of the user, and may be a selector that performs mode selection automatically by a program of the controller 6.

The control of the cutting blade motors 21 to 23 may be different from each other. The control of the middle cutting blade motor 22 may be different from the control of the right cutting blade motor 21 and the middle cutting blade motor 22. When the positions of the cutting blades 11 to 13 are different from each other in the front-rear direction, the rotational frequency or torque of the cutting blade located at a front side in the proceeding direction may be set to be higher than the rotational frequency or torque of the cutting blade located at a rear side in the proceeding direction.

When the processing circuitry 7 detects that the traveling operation interface 8 has selected the backward movement, the processing circuitry 7 may decrease the rotational frequencies of the cutting blade motors 21 to 23 more than when the processing circuitry 7 detects that the traveling operation interface 8 has selected the forward movement. For example, when the lawn mower 1 moves backward, the processing circuitry 7 may stop the cutting blade motors 21 to 23 or may set the cutting blade motors 21 to 23 to idle rotational frequencies. Moreover, when the cutting blades 21 to 23 are double-edged blades, the processing circuitry 7 may reversely rotate the cutting blade motors 21 to 23 at the time of the backward movement of the lawn mower 1.

The processing circuitry 7 may calculate a turning direction from a difference between the rotational frequency of the right driving wheel 2 and the rotational frequency of the left driving wheel 2. The processing circuitry 7 may make the rotational frequency of the right cutting blade motor 21 and the rotational frequency of the left cutting blade motor 23 different from each other in accordance with the turning direction. For example, the processing circuitry 7 may set the rotational frequencies such that the rotational frequency of the cutting blade motor 23 located close to an outside wheel at the time of the turn (for example, a left wheel at the time of right turn) becomes higher than the rotational frequency of the cutting blade motor 21 located close to an inside wheel at the time of the turn (for example, a right wheel at the time of right turn).

When the rotational frequencies of the traveling motors 3 increase, the processing circuitry 7 may increase the rotational frequencies of the cutting blade motors 21 to 23. In other words, when the rotational frequencies of the traveling motors 3 decrease, the processing circuitry 7 may decrease the rotational frequencies of the cutting blade motors 21 to 23. When rotation acceleration of the traveling motors 3 increases, the processing circuitry 7 may increase the rotational frequencies of the cutting blade motors 21 to 23. The processing circuitry 7 may include a mode in which the rotation directions of the adjacent cutting blades among the cutting blades 21 to 23 are set to be opposite to each other.

When the lawn mower 1 travels on a slope such that the position of the right driving wheel 2 in a vertical direction and the position of the left driving wheel 2 in the vertical direction become different from each other, the torque (or the rotational frequency) of the cutting blade 11 located at an upper side on the slope may be set to be different from the torque (or the rotational frequency) of the cutting blade 13 located at a lower side on the slope. For example, in consideration that the mowed grass moves toward a lower side on the slope by its own weight, the torque of the cutting blade 13 located at the lower side on the slope may be set to be higher than the torque of the cutting blade 11 located at the upper side on the slope.

As described above, the embodiment has been described as an example of the technology disclosed in the present application. However, the technology in the present disclosure is not limited to this and is also applicable to embodiments in which modifications, replacements, additions, omissions, and the like are suitably made. Moreover, a new embodiment may be prepared by combining the components described in the above embodiment. For example, some of components or methods in one embodiment may be applied to another embodiment. Some components in an embodiment may be separated and arbitrarily extracted from the other components in the embodiment. Furthermore, the components shown in the attached drawings and the detailed explanations include not only components essential to solve the problems but also components for exemplifying the above technology and not essential to solve the problems.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The following aspects disclose preferred embodiments.

First Aspect

A lawn mower including:
a cutting blade motor that drives a cutting blade;
a mode selector that selects one of modes including a
    normal lawn mowing mode and a grass removal mode
    in which grass accumulated at the cutting blade is
    brushed away; and
processing circuitry configured to control the cutting
    blade motor in the mode selected by the mode selector,
    wherein:
in the normal lawn mowing mode, the cutting blade motor
    is controlled so as to rotate in a normal rotation
    direction at a predetermined rotational frequency or
    with a predetermined torque; and
in the grass removal mode, the cutting blade motor is
    controlled such that the rotational frequency or torque
    of the cutting blade motor changes more significantly
    than the rotational frequency or torque of the cutting
    blade motor in the normal lawn mowing mode, or the
    cutting blade motor rotates in a reverse rotation direc-
    tion.

According to this configuration, when the grass is accumulated at the cutting blade by the operation of the lawn mower, the grass can be brushed away from the cutting blade by the execution of the grass removal mode.

Second Aspect

The lawn mower according to the first aspect, wherein when a predetermined condition indicating that the grass has been accumulated at the cutting blade is satisfied, the processing circuitry outputs a warning signal.

According to this configuration, a phenomenon that the grass is accumulated at the cutting blade can be handled.

Third Aspect

The lawn mower according to the second aspect, further including a cutting blade sensor that detects a current value of the cutting blade motor or the rotational frequency of the cutting blade motor, wherein:
    the predetermined condition includes a condition that a
        detected value of the cutting blade sensor falls outside
        a predetermined allowable limit.
    According to this configuration, the phenomenon that the grass is accumulated at the cutting blade can be handled.

Fourth Aspect

The lawn mower according to any one of the first to third aspects, wherein:
    the modes further include a silent lawn mowing mode;
        and
    in the silent lawn mowing mode, the cutting blade motor
        is controlled at a rotational frequency lower than the
        rotational frequency in the normal lawn mowing mode
        or with a torque lower than the torque in the normal
        lawn mowing mode.
    According to this configuration, when the mode selector selects the silent lawn mowing mode, the lawn mower can be silently driven.

Fifth Aspect

The lawn mower according to any one of the first to fourth aspects, further including:
    a driving wheel;
    a driving wheel motor that drives the driving wheel; and
    an input sensor that detects which of OFF and ON has
        been selected, wherein:
    when the OFF is being selected, the processing circuitry
        controls the driving wheel motor to stop the driving
        wheel motor;
    when a state where the OFF is being selected is changed
        to a state where the ON is being selected, the process-
        ing circuitry changes a control target value in a prede-
        termined change pattern, the control target value being
        a target rotational frequency or target torque of the
        driving wheel motor; and
    in the predetermined change pattern, the control target
        value increases at a predetermined change rate with
        time, and when the control target value reaches a
        predetermined value, the control target value is main-
        tained constant.
    According to this configuration, even in the case of using the input sensor that can only detect which of the ON and the OFF has been selected, the lawn mower can start traveling with smooth driving feeling.

Sixth Aspect

The lawn mower according to the fifth aspect, wherein when the state where the ON is being selected is changed to the state where the OFF is being selected, the processing circuitry sets the control target value to zero.

According to this configuration, when the OFF is selected, the lawn mower can be quickly stopped.

Seventh Aspect

A lawn mower including:

a cutting blade motor that drives a cutting blade;

a mode selector that selects one of modes including a normal lawn mowing mode and a silent lawn mowing mode; and processing circuitry configured to control the cutting blade motor in the mode selected by the mode selector, wherein:

in the normal lawn mowing mode, the cutting blade motor is controlled such that a rotational frequency or torque of the cutting blade motor becomes a predetermined rotational frequency or a predetermined torque; and in the silent lawn mowing mode, the cutting blade motor is controlled such that the rotational frequency or torque of the cutting blade motor becomes a rotational frequency lower than the rotational frequency in the normal lawn mowing mode or a torque lower than the torque in the normal lawn mowing mode.

According to this configuration, when the mode selector selects the silent lawn mowing mode, the lawn mower can be silently driven.

Eighth Aspect

A lawn mower including:

a driving wheel;

a driving wheel motor that drives the driving wheel;

an input sensor that detects which of OFF and ON has been selected; and processing circuitry configured to control the driving wheel motor in accordance with detection of the input sensor, wherein:

when the OFF is being selected, the processing circuitry controls the driving wheel motor to stop the driving wheel motor;

when a state where the OFF is being selected is changed to a state where the ON is being selected, the processing circuitry changes a control target value in a predetermined change pattern, the control target value being a target rotational frequency or target torque of the driving wheel motor; and in the predetermined change pattern, the control target value increases at a predetermined change rate with time, and when the control target value reaches a predetermined value, the control target value is maintained constant.

According to this configuration, even in the case of using the input sensor that can only detect which of the ON and the OFF has been selected, the lawn mower can start traveling with smooth driving feeling.

What is claimed is:

1. A lawn mower comprising:

at least one cutting blade motor that drives a cutting blade;

a mode selector that selects one of modes by being operated by a driver, the modes including a lawn mowing mode and a grass removal mode in which grass accumulated at the cutting blade is brushed away;

a driving wheel;

a driving wheel motor that drives the driving wheel; and processing circuitry configured to control the cutting blade motor in the mode selected by the mode selector, wherein:

in the lawn mowing mode, the cutting blade motor is controlled so as to rotate in a normal rotation direction at a predetermined rotational frequency or with a predetermined torque;

in the grass removal mode, the cutting blade motor is controlled such that a rotational frequency or a torque of the cutting blade motor pulsates, or the cutting blade motor rotates in a reverse rotation direction; and when the lawn mowing mode is switched to the grass removal mode, the processing circuitry maintains the grass removal mode and stops or decelerates the driving wheel motor.

2. The lawn mower according to claim 1, wherein when a predetermined condition indicating that the grass has been accumulated at the cutting blade is satisfied, the processing circuitry outputs a warning signal.

3. The lawn mower according to claim 2, further comprising a cutting blade sensor that detects a current value of the cutting blade motor or the rotational frequency of the cutting blade motor, wherein:

the predetermined condition includes a condition that a detected value of the cutting blade sensor falls outside a predetermined allowable limit.

4. The lawn mower according to claim 1, wherein:

the modes further include a silent lawn mowing mode; and in the silent lawn mowing mode, the cutting blade motor is controlled at a rotational frequency lower than the rotational frequency in the lawn mowing mode or with a torque lower than the torque in the lawn mowing mode.

5. The lawn mower according to claim 1, further comprising:

an input sensor that detects which of OFF and ON has been selected, wherein:

when the OFF is being selected, the processing circuitry controls the driving wheel motor to stop the driving wheel motor;

when a state where the OFF is being selected is changed to a state where the ON is being selected, the processing circuitry changes a control target value in a predetermined change pattern, the control target value being a target rotational frequency or a target torque of the driving wheel motor; and in the predetermined change pattern, the control target value increases at a predetermined change rate with time, and when the control target value reaches a predetermined value, the control target value is maintained constant.

6. The lawn mower according to claim 5, wherein when the state where the ON is being selected is changed to the state where the OFF is being selected, the processing circuitry sets the control target value to zero.

7. The lawn mower according to claim 1, wherein:

the at least one cutting blade motor comprises cutting blade motors that drive corresponding cutting blades; and the processing circuitry controls any one of the cutting blade motors in the grass removal mode.

8. The lawn mower according to claim 1, wherein when the driver operates a mode operating lever, the mode selector selects one of the modes.

9. The lawn mower according to claim 1, wherein in the grass removal mode, the processing circuitry controls the cutting blade motor such that the cutting blade motor rotates in a reverse rotation direction.

10. A lawn mower comprising:

at least one cutting blade motor that drives a cutting blade;

a mode selector that selects one of modes including a lawn mowing mode and a grass removal mode in which grass accumulated at the cutting blade is brushed away;

a driving wheel;

a driving wheel motor that drives the driving wheel; and processing circuitry configured to control the cutting blade motor in the mode selected by the mode selector, wherein:

in the lawn mowing mode, the cutting blade motor is controlled so as to rotate in a normal rotation direction at a predetermined rotational frequency or with a predetermined torque;

in the grass removal mode, the cutting blade motor is controlled such that a rotational frequency or a torque of the cutting blade motor pulsates, or the cutting blade motor rotates in a reverse rotation direction;

the at least one cutting blade motor comprises cutting blade motors that drive corresponding cutting blades;

the processing circuitry controls any one of the cutting blade motors in the grass removal mode; and when the lawn mowing mode is switched to the grass removal mode, the processing circuitry maintains the grass removal mode and stops or decelerates the driving wheel motor.

* * * * *